(12) United States Patent
Deshpande

(10) Patent No.: US 7,471,845 B2
(45) Date of Patent: Dec. 30, 2008

(54) DE-RINGING FILTER

(75) Inventor: Sachin Govind Deshpande, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1030 days.

(21) Appl. No.: 10/815,029

(22) Filed: Mar. 31, 2004

(65) Prior Publication Data

US 2005/0147316 A1 Jul. 7, 2005

Related U.S. Application Data

(60) Provisional application No. 60/535,045, filed on Jan. 6, 2004, provisional application No. 60/535,050, filed on Jan. 6, 2004.

(51) Int. Cl.
*G06K 9/40* (2006.01)
(52) U.S. Cl. .................. 382/261; 382/260; 382/274; 382/275; 358/3.26; 358/3.27; 358/463
(58) Field of Classification Search .................. 382/235, 382/243, 260, 274, 275; 358/3.26, 3.27, 358/463
See application file for complete search history.

(56) References Cited

U.S. PATENT DOCUMENTS

| | | | | |
|---|---|---|---|---|
| 5,581,371 | A | * | 12/1996 | Spaulding et al. .......... 358/3.03 |
| 5,598,184 | A | * | 1/1997 | Barkans ...................... 345/597 |
| 5,802,218 | A | | 9/1998 | Brailean ..................... 382/275 |
| 5,819,035 | A | * | 10/1998 | Devaney et al. ............. 709/202 |
| 5,850,294 | A | | 12/1998 | Apostolopoulos et al. ... 358/433 |
| 5,852,475 | A | | 12/1998 | Gupta et al. ................ 348/606 |
| 6,115,503 | A | * | 9/2000 | Kaup ......................... 382/268 |
| 6,226,050 | B1 | | 5/2001 | Lee ............................ 348/607 |

(Continued)

FOREIGN PATENT DOCUMENTS

EP 0 797 349 9/1997

(Continued)

OTHER PUBLICATIONS

Removal of Blocking and Ringing Artifacts in Transform Coded Images, Hu et al., Acoustics, Speech, and Signal Processing, IEEE, vol. 4, Apr. 21, 1997, pp. 2565-2568.

(Continued)

*Primary Examiner*—Yosef Kassa
(74) *Attorney, Agent, or Firm*—Law Office of Gerald Maliszewski; Gerald Maliszewski

(57) ABSTRACT

An image de-ringing filter system and method are provided. The method comprises: accepting image pixels; collecting data from a first group of pixels neighboring a test pixel; in response to the first group data, deciding if the test pixel includes image ringing artifacts; collecting data from a second group of pixels neighboring the test pixel; in response to the second group data, generating a filtered value (FV); and, replacing the test pixel actual value with FV. Typically, collecting data from the first and second group of pixels includes the performance of a mathematical operation. For example, a matrix may be defined for the multiplication of the first group of pixels. Values of pixels on a first side of the coordinate axis may be subtracted from pixels on a second side of the coordinate axis, opposite of the first side. Then, the difference is compared to a threshold.

67 Claims, 5 Drawing Sheets

U.S. PATENT DOCUMENTS

| | | | |
|---|---|---|---|
| 6,236,763 B1 | 5/2001 | Wong et al. | 382/261 |
| 6,360,024 B1 | 3/2002 | Tan et al. | 382/260 |
| 6,539,060 B1 * | 3/2003 | Lee et al. | 375/240.29 |
| 6,728,414 B1 * | 4/2004 | Chang et al. | 382/254 |
| 7,003,174 B2 * | 2/2006 | Kryukov et al. | 382/266 |
| 7,027,661 B2 * | 4/2006 | Estevez et al. | 238/37 |
| 7,251,276 B2 * | 7/2007 | Lee et al. | 375/240.03 |
| 2002/0080882 A1 | 6/2002 | Kitagawa | 375/240.29 |
| 2002/0118399 A1 | 8/2002 | Estevez | 358/426.07 |
| 2002/0122602 A1 | 9/2002 | Rouvellou | 382/261 |
| 2003/0020835 A1 | 1/2003 | Petrescu | 348/625 |
| 2003/0053711 A1 | 3/2003 | Kim | 382/268 |
| 2003/0081854 A1 | 5/2003 | Deshpande | 382/261 |

FOREIGN PATENT DOCUMENTS

| | | |
|---|---|---|
| EP | 1 351 508 | 10/2003 |
| GB | 2373661 | 9/2002 |
| JP | 4321391 | 11/1992 |
| WO | WO 00/14968 | 3/2000 |
| WO | WO 03/081534 | 10/2003 |

OTHER PUBLICATIONS

Spatial-temporal post-filtering of 3-D coded video sequences, Electrotechnical Conference, vol. 2, May 29, 2000, pp. 474-477.

Hardie et al., Gradient-Based Edge Detection Using Nonlinear Edge Enhancing Prefilters, IEEE Transactions on Image Processing, vol. 4, No. 11, Nov. 1995, pp. 1572-1577.

* cited by examiner

Fig. 3

| nE | TIMES ADDED | TIMES SUBTRACTED | TIMES RIGHT-SHIFTED | |
|---|---|---|---|---|
| 1 | 1 | 0 | 1 | |
| 2 | 2 | 0 | 2 | |
| 3 | 1 | 0 | 2 | |
| 4 | 4 | 0 | 3 | |
| 5 | 3 | 0 | 3 | |
| 6 | 2 | 0 | 3 | |
| 7 | 1 | 0 | 3 | |
| 8 | 1 | 1 | 3 | |

LUT

START — 700

ACCEPTING IMAGE PIXELS — 702

PERFORMING MATH OPERATION ON FIRST GROUP OF PIXELS — 704

DECIDING IF TEST PIXEL HAS RINGING ARTIFACTS — 706

PERFORMING MATH OPERATION ON SECOND GROUP OF PIXELS — 708

GENERATING FV — 710

REPLACING TEST PIXEL WITH FV — 712

```
if(De-ringing filter) // De-ringing filter decision made by decision stage
{
nE=0;
newVal=0;

for(ix=1;ix<=1;ix++)
        for(iy=-1;iy<=1;iy++)
        {
                if(Map(i + ix, j + iy)==0)
                {
                    if((ix!=0 || (iy!=0))
                    {
                            newVal = newVal + I(i+ix, j+iy);
                            nE++;
                    }
                }
            }
        }
If(nE==1)
{
            I(i, j)+((newVal +I(i, j) +1)>>1);
}
else if(nE<4)
{
            for(ii=nE;ii<4;ii++)
            {
                    newVal = newVal + I(i, j);
            }
            I(i, j)=(( newVal +2)>>2);
}
else if(nE<8)
{
            for(ii=nE;ii<8;ii++)
            {
                    newVal = newVal + I(i, j);
            }
            I(i, j)=((rAug+4)>>3);
}
else if(nE==8)
        {
            I(i, j)=(( newVal- I (i + 1, j + 1) + I(i, j) +4)>>3);
}
}
```

Fig. 4

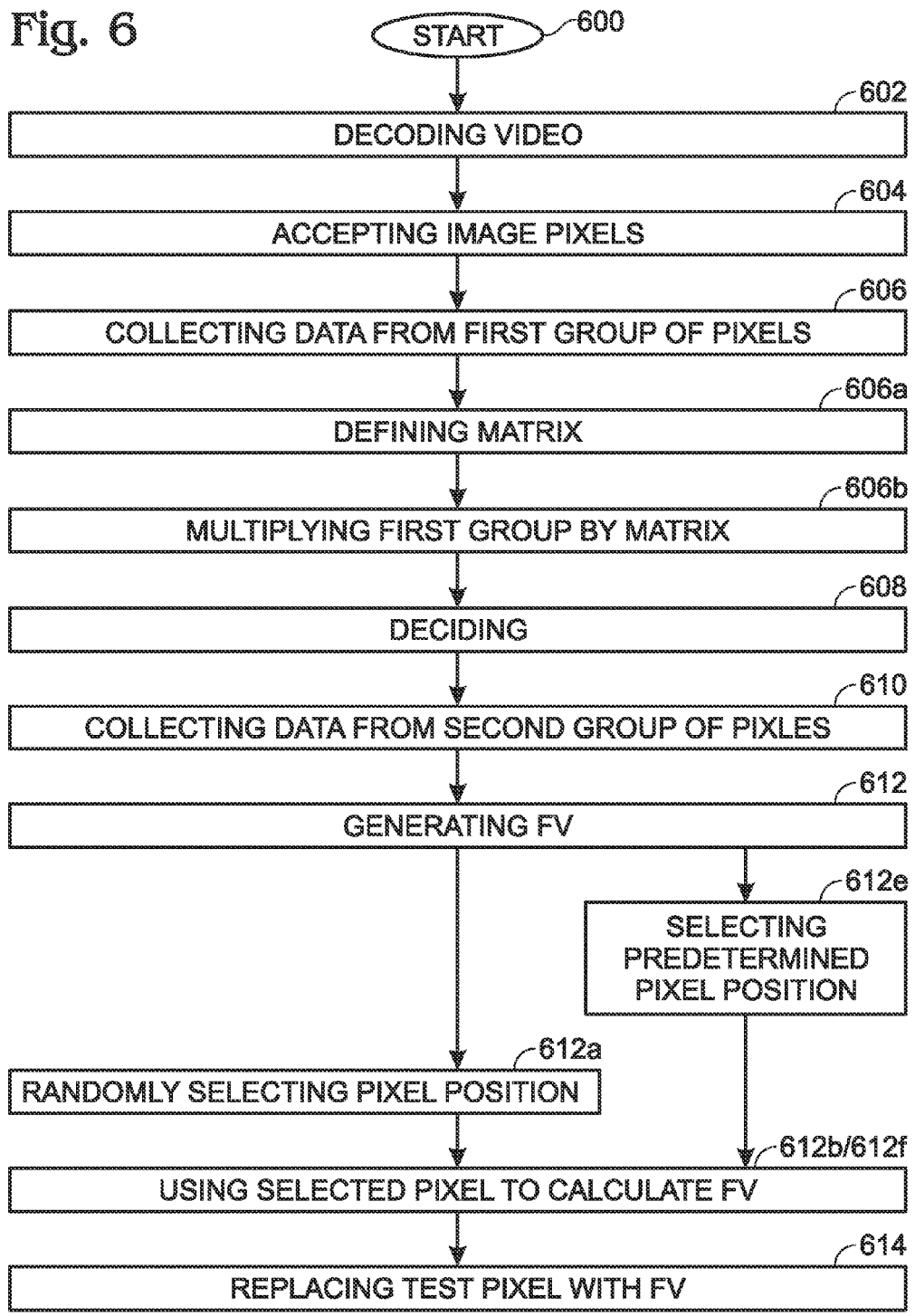

DE-RINGING FILTER

RELATED APPLICATIONS

This application claims the benefit of a provisional patent application entitled, METHODS FOR REMOVING RINGING ARTIFACTS, invented by Deshpande et al., Ser. No. 60/535,045, filed Jan. 6, 2004.

This application claims the benefit of a provisional patent application entitled, A DE-RINGING FILTER, invented by Sachin Deshpande, Ser. No. 60/535,050, filed Jan. 6, 2004.

BACKGROUND OF THE INVENTION

1. Field of the Invention

This invention generally relates to compressed image and video coding and, more particularly, to a method for filtering ringing artifacts that may occur as a result of compressed image and video encoding/decoding processes.

2. Description of the Related Art

Computation resources and bandwidth can be saved by encoding images and videos at a low bit-rate. However, low bit-rate encoding may result in several types of artifacts in the decompressed images. The most notable artifacts include blocking and ringing artifacts. The ringing artifacts are typically observed around the true edges of an image. The ringing artifacts are also referred to as mosquito artifacts, as they tend to be annoying, especially in moving images (video sequences). A variety of filters exist for filtering out these unwanted artifacts. These include de-blocking and de-ringing filters. For de-ringing, conventional methods operate in both the transform and pixel domains. Other conventional de-ringing filters make use of quantization information. One drawback of all the above-mentioned de-ringing filters is that are computationally intensive. Thus, the filters are not suitable for all receiving systems. Further, the filters may result in unacceptable delays, even when they can be implemented.

It would be advantageous if a low complexity de-ringing filter could be developed for ringing artifact reduction.

SUMMARY OF THE INVENTION

The present invention is a de-ringing filter with a low computational complexity. A decision to apply the filter is made for each pixel based on its edge strength. In one aspect, a 3×3 kernel is used for filtering. Only the non-edge neighbor pixels are used to filter the current (test) pixel. In this aspect, the filter uses all of the non-edge neighbor pixels and the current pixel weighted appropriately, based on the total number of non-edge neighbor pixels. The invention works entirely in the pixel domain and does not use or need any quantization information. Further, the solution is not necessarily block or macroblock-based.

Accordingly, an image de-ringing filter method is provided. The method comprises: accepting a plurality of image pixels; collecting data from a first group of pixels neighboring a test pixel; in response to the first group data, deciding if the test pixel includes image ringing artifacts; collecting data from a second group of pixels neighboring the test pixel; in response to the second group data, generating a filtered value (FV); and, replacing the test pixel actual value with FV.

Typically, collecting data from the first and second group of pixels includes the performance of a mathematical operation. For example, a matrix may be defined for the multiplication of the first group of pixels. The mathematical operation may involve the comparison of pixels values on opposite sides of a coordinate axis bisecting the test pixel. More specifically, values of pixels on a first side of the coordinate axis may be subtracted from pixels on a second side of the coordinate axis, opposite of the first side. Then, the difference is compared to a threshold.

In another aspect, generating a FV in response to the second group operation includes: generating a map value for each pixel in the second group; and, using pixels from the second group to calculate FV, if they are equal to a first map value. Specifics of map values and the definition of the second group are provided.

Additional details of the above-described method, and an image de-ringer filer system are provided below.

BRIEF DESCRIPTION OF THE DRAWINGS

FIG. 3 is a drawing depicting the LUT of FIG. 1.

FIG. 4 is an exemplary pseudo-code for a de-ringing filter.

FIG. 6 is a flowchart illustrating the present invention image de-ringing filter method.

FIG. 7 is a flowchart illustrating another aspect of the present invention image de-ringing filter method.

DETAILED DESCRIPTION OF THE PREFERRED EMBODIMENTS

Figures 1, 2:
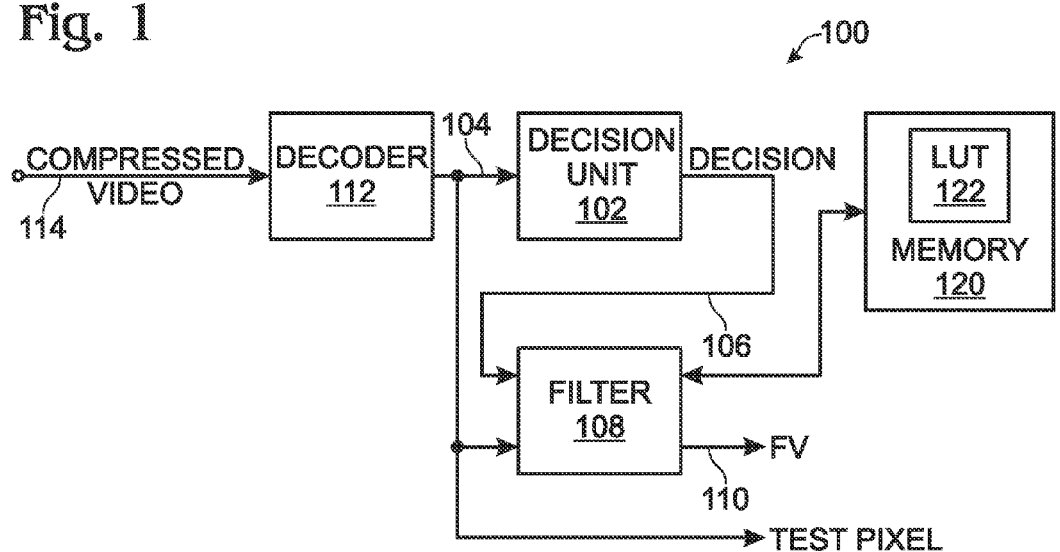
FIG. 1 is a schematic block diagram of the present invention image de-ringing filter system.
FIG. 2 is a diagram depicting a test pixel, and a group of neighboring pixels.

FIG. 1 is a schematic block diagram of the present invention image de-ringing filter system. The system 100 comprises a decision unit 102 having an input on line 104 to accept a plurality of image pixels. The decision unit 102 collects data from a first group of pixels neighboring a test pixel. In response to the first group data, the decision unit 102 supplies a decision at an output on line 106 as to whether the test pixel includes image ringing artifacts. A filter 108 has an input on line 104 to accept the plurality of image pixels and an input on line 106 to accept the decision. The filter 108 collects data from a second group of pixels neighboring the test pixel. In response to the second group data, the filter generates a filtered value (FV) and supplies the FV at an output on line 110 as a replacement to the test pixel actual value.

A decoder 112 has a connection on line 114 to accepted encoded video information. The encoded video may come from a network, local storage, or other source. This information may be encoded in a standard such as motion pictures expert group (MPEG) or H.264 standards, to name a few examples. The decoder 112 has an output on line 104 to supply the plurality of image pixels to the decision unit 102, and to the filter 108, as decoded image information.

FIG. 2 is a diagram depicting a test pixel, and a group of neighboring pixels. Pixels from the first group are represented with a "1", while pixels from the second group are represented with a "2". Note, the first and second group of pixels are not necessarily the same. Although 9 pixel positions are shown, neither the first nor the second group of pixels is limited to any particular number.

Typically, the filter performs a mathematical operation on the second group of pixels. Likewise, the decision unit typically performs a mathematical operation on the first group of pixels. For example, the decision unit may define a matrix and multiply the first group of pixels by the matrix, or more than one matrix. In some aspects, the decision unit defines a matrix such that a zero value is assigned to the position of the test pixel in the matrix. In some aspects matrix may be used for a vector dot product. In one aspect, the decision unit may compare values of pixels on opposite sides of a coordinate axis bisecting the test pixel. For example, 1*a*, 1*d*, and 1*g* may be compared to 1*c*, 1*f*, and 1*i*. In another aspect, the decision unit subtracts the values of pixels on a first side of the coordinate axis from pixels on a second side of the coordinate axis, opposite of the first side, and compares the difference to a threshold.

In a different aspect, the decision unit compares the values of pixels on opposite sides of a plurality of coordinate axes, oriented in a plurality of directions. For example, pixels 1*a* and 1*c* may be compared to pixels 1*g* and 1*i*, while pixels 1*a* and 1*g* are compared to pixels 1*c* and 1*i*. In one aspect, the decision unit collects data from a group of 4 pixels neighboring the test pixel. For example, pixel positions 1*a*, 1*c*, 1*g*, and 1*i* can be used. The results of any of the mathematical operations can be compared to a threshold as a means of making a decision as to whether a test pixel is to be filtered.

With respect to a test pixel P(i,j), with i and j indicating row and column indices, respectively, and P(i,j) representing a pixel gray value, operators H1 and H2 may be used to derive gradient values $g_{H1}(i,j)$ and $g_{H2}(i,j)$, respectively, where $$H1 = [1\ 0\ -1];\ \text{and},$$

$$H2 = \begin{bmatrix} 1 \\ 0 \\ -1 \end{bmatrix}$$

The decision unit calculates $S(i,j)=(|g_{H1}(i,j)|+|g_{H2}(i,j)|+1)>>1$, where >>x represents a binary value right-shift of x. Then, the decision unit decides that P(i,j) is a ringing artifact, if S(i,j)<threshold. Note, this examples uses 4 test pixel neighbors, from the immediately neighboring 8 pixels to make a filter decision.

In other aspects, the position of pixels, the number of pixels, and the size of the neighboring group from which the pixels are selected may be different. For example, the operators may be as follows:

$$H1 = [1\ 1\ 0\ -1\ -1];\ \text{and},$$

$$H2 = \begin{bmatrix} 1 \\ 1 \\ 0 \\ -1 \\ -1 \end{bmatrix}$$

X-axis, reflection, y-axis reflection, diagonal reflection, diagonal reflection symmetry, −90 degree rotation symmetry, centro symmetry, quadrantal symmetry, diagonal symmetry, 4-fold rotation symmetry, and octagonal symmetry are examples of other coordinate axes comparisons that can be made.

Referring now to the filter, in some aspects the filter may add the test pixel to the second group of pixels. Alternately, the test pixel value is not used to calculate FV. In one aspect, the filter collects data from 8 pixels neighboring the test pixel (2*a*, 2*b*, 2*c*, 2*d*, 2*f*, 2*g*, 2*h*, and 2*i*). However, other definitions of the second pixel group are possible.

The decision unit, in response to comparing S(i,j) to the threshold, generates a map value M(i,j) for P(i,j), where:

$M(i,j)=1$, if $S(i,j) \geq$ threshold; and, $M(i,j)=0$, if $S(i,j)<$ threshold;

Then, the filter uses pixels from the second group to calculate FV, if they are equal to a first map value. In some aspects, the filter uses a first map value equal to 0. Alternately, the filter uses a first map value not equal to 1.

In one aspect of the system, the filter selects pixels from the second group to calculate FV, if they are equal to the first map value. For example, the filter may randomly select pixels from the second group to calculate FV, if they are equal to the first map value. More generally, the filter may accept a plurality of image pixel sets, in a plurality of frames. Then, it generates FV by randomly selecting a first collection of pixel positions with respect to the test pixel, and uses pixels in the first collection to calculate FV for each test pixel in every image pixel set, in every frame.

In another aspect, the filter generates FV by randomly selecting a first collection of pixel positions with respect to the test pixel in a first image pixel set in a current frame, and uses pixels in the first collection to calculate FV for each test pixel in every image pixel set in the current frame. Further, the filter randomly reselects a second collection of pixel positions in an image pixel set in a frame subsequent to the current frame, and uses pixels in the second collection to calculate FV for each test pixel in every image pixel set in the subsequent frame.

In another aspect, the filter selects pixels in predetermined pixel positions, with respect to the test pixel, from the second group to calculate FV, if it is equal to the first map value. More generally, the filter may accept a plurality of image pixel sets in a plurality of frames, and select the pixels in the predetermined pixel positions to calculate FV for each test pixel in every image pixel set, in every frame. For example, the filter may select the pixels in a predetermined first collection of pixel positions to calculate FV for each test pixel in every image pixel set in a current frame, and select the pixels in a predetermined second collection of pixel positions to calculate FV for each test pixel in every image pixel set in a frame subsequent to the current frame.

In another aspect, the filter generates FV by selecting the pixels in the predetermined first collection of pixel positions to calculate FV for test pixels in a first image pixel set and, then, selecting the pixels in the predetermined second collection of pixel positions to calculate FV for test pixels in a second image pixel set.

In a different aspect of the invention, the filter uses pixels from the second group to calculate FV, if they are equal to a first map value, by selectively weighting second group pixel values. Then, the weighted values are summed and averaged. In this aspect, the filter may add the test pixel to the second group of pixels. The filter may also selectively weigh in response to number of pixels in the second group.

The following is a specific example of a filter algorithm. The filter generates FV by:

calculating nV=sum of second group pixel values for pixels having a map value of 0;

calculating nE=total number of pixels in the second group with a map value of 0;

if nE=1, then $FV=(nV+P(i,j)+1)>>1;$ else, if nE<4, then $nV=nV+(4-nE)*P(i,j);$ and, $FV=(nV+2)>>2;$ else, if nE<8, then $nV=nV+(8-nE)*P(i,j)$; and, $FV=(nV+4)>>3$;

else, if nE=8, then $nV=nV-P(i+1,j+1)+P(i,j)$; and, $FV=(nV+4)>>3$.

In an alternate algorithm, the filter generates FV by:

calculating nV=sum of second group pixel values for pixels having a map value of 0;

calculating nE=total number pixels in the second group with a map value of 0;

if nE=1, then $FV=(nV+P(i,j)+1)>>1$;

else, if nE<4, then $nV=nV+(4-nE)*P(i,j)$; and, $FV=(nV)>>2$;

else, if nE<8, then $nV=nV+(8-nE)*P(i,j)$; and, $FV=(nV)>>3$;

else, if nE=8, then $nV=nV-P(i+1,j+1)+P(i,j)$; and, $FV=(nV)>>3$.

Returning to FIG. 1, some aspects of the system 100 include an accessible memory 120 including a lookup table (LUT) 122 with pre-calculated values. The filter 108 generates a FV in response accessing the LUT 122.

FIG. 3 is a drawing depicting the LUT of FIG. 1. As shown, the LUT 122 is indexed by nE values. The filter calculates nE, where nE=the total number of pixels in the second group with the first map value. The filter then uses the calculated nE value to access the LUT 122. In one aspect, the LUT 122 includes a value for each nE indicating the number of times the test pixel P(i,j) is added. In another aspect, the LUT 122 includes a value for each nE indicating the number of times the result is right shifted. In a different aspect, the LUT 122 includes a value for each nE indicating if a pixel value from second group of pixels is subtracted, or not.

Functional Description

As described above, the present invention de-ringing filter consists of decision and filtering functions. The following description is one specific example of the de-ringing filter.

Decision Stage

For each pixel, a decision is made as to whether the pixel should be filtered or left unprocessed. The decision is based on following computation:

For each pixel, use the operators $H_1=[1\ 0\ -1]$ and $$H_2 = \begin{bmatrix} 1 \\ 0 \\ -1 \end{bmatrix}$$

to compute two gradient values that are denoted by $g_{H1}(i,j)$ and $g_{H2}(i,j)$. The operators are selected so that the actual current (test) pixel itself is not used in the calculation of its Strength(i, j). Instead, only its 4 neighbors are used for this computation. Then a local measure Strength(i, j) for the current pixel (i, j) is calculated as:

```
Strength(i,j) = (|g_H1(i,j)| + |g_H2(i,j)| + 1) >> 1;
if (Strength(i,j) >= Threshold)
{
    Map (i,j) = 1;
}
else
{
    Map (i,j) = 0;
    Apply De-ringing filter;
},
``` where (i, j) is the pixel index and Threshold is a parameter which controls the filtering decision. The Threshold is a parameter that can be manipulated to vary the effective strength of the filter. A high-threshold value results in more pixels getting filtered and, thus, a stronger filter. A low-threshold value results in a lesser number of pixels getting filtered and, thus, a weaker filter.

If the Strength(i, j) of a test pixel is less than the threshold, then the de-ringing filter is applied to this pixel. Otherwise, the pixel is left unprocessed, i.e., its value is used without changing. If the decision is made to apply a de-ringing filter to a pixel, then the Strength(i, j) value is computed and compared to the Threshold, to obtain the Map(i, j) values for the current pixel's 8 neighbors in the 3×3 size kernel. These values are used in the de-ringing filter stage, as explained below.

Low Complexity Adaptive Filtering Stage

Based on the decision from the previous stage, the pixels are processed by de-ringing filter, or not processed. The filter has a low complexity, as compared to other approaches, and is signal adaptive. The filtering can be done in place, or the results could be stored in a separate memory store. For example, satisfactory results are obtained with an in-place computation approach, using a 3×3 kernel.

FIG. 4 is an exemplary pseudo-code for a de-ringing filter.

Figure 5:
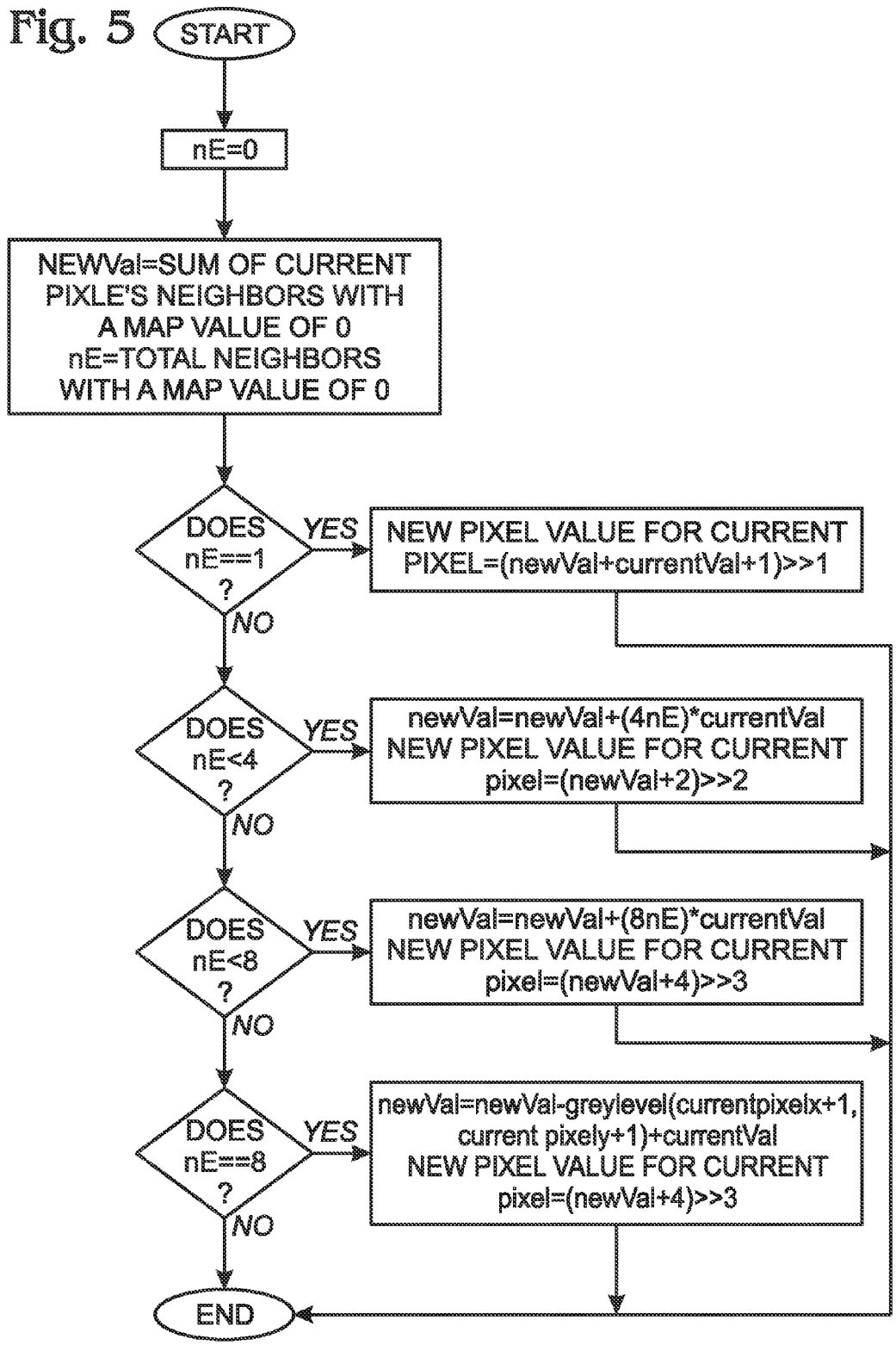
FIG. 5 is a drawing illustrating an exemplary aspect of the present invention filter.

FIG. 5 is a drawing illustrating an exemplary aspect of the present invention filter. The filter can be realized using only addition, subtraction, and shift operations. The multiplication operations in FIG. 5 can also be realized as multiple addition operations. In one case, a randomly (or selectively—based on some criterion) chosen neighbor pixel is not used in the filtering of the current pixel (if nE is equal to 8, for example). A lookup table can be used to realize the filter. The lookup table can be indexed by the value nE, and can store the information about the number of times the center pixel is added. The LUT can also be used if any neighbor pixels need to be subtracted (or effectively not used). The resulting average value is used to replace the current pixel under consideration.

FIG. 6 is a flowchart illustrating the present invention image de-ringing filter method. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 600.

Step 602 decodes compressed image information. Step 604 accepts a plurality of image pixels. That is, the decoded image information is accepted. Step 606 collects data from a first group of pixels neighboring a test pixel. Step 608 decides if the test pixel includes image ringing artifacts, in response to the first group data. Step 610 collects data from a second group of pixels neighboring the test pixel. Step 612, in response to the second group data, generates a filtered value (FV). Step 614 replaces the test pixel actual value with FV. Note, FV is not necessarily calculated, or used to replace the test pixel, depending upon the result of the decision process in Step 608.

In one aspect, collecting data from a second group of pixels neighboring a test pixel in Step 610 includes performing a mathematical operation on the second group of pixels. For example, collecting data from a second group of pixels neighboring the test pixel in Step 610 includes collecting data from 8 pixels neighboring the test pixel. In another aspect, Step 610 adds the test pixel to the second group of pixels.

Likewise, collecting data from a first group of pixels neighboring a test pixel in Step 606 may include performing a mathematical operation on the first group of pixels. In some aspects, Step 606 compares the results of the mathematical operation to a threshold.

For example, performing a mathematical operation on the first group of pixels may include substeps. Step 606a defines a matrix. Step 606b multiplies the first group of pixels by the matrix. In one aspect, the matrix is defined such that a zero value is assigned to the position of the test pixel in the matrix.

In one aspect, performing a mathematical operation on the first group of pixels (Step 606) may include comparing values of pixels on opposite sides of a coordinate axis bisecting the test pixel. For example, comparing values of pixels on opposite sides of a coordinate axis bisecting the test pixel may include: subtracting the values of pixels on a first side of the coordinate axis from pixels on a second side of the coordinate axis, opposite of the first side; and, comparing the difference to a threshold. In some aspects, a fixed threshold value is selected. Further, the values of pixels may be compared on opposite sides of a plurality of coordinate axes, oriented in a plurality of directions. In another example, data is collected from a group of 4 pixels neighboring the test pixel.

More specifically, values of pixels on opposite sides of a coordinate axis bisecting the test pixel may be compared (Step 606) as follows:

with respect to a test pixel P(i,j), with i and j indicating row and column indices, respectively, and P(i,j) representing a pixel gray value, using operators H1 and H2 to derive gradient values $g_{H1}(i,j)$ and $g_{H2}(i,j)$, respectively, where $H1 = [1\ 0\ -1]$; and, $$H2 = \begin{bmatrix} 1 \\ 0 \\ -1 \end{bmatrix}$$

calculating $S(i,j) = (|g_{H1}(i,j)| + |g_{H2}(i,j)| + 1) >> 1$;

where >>x represents a binary value right-shift of x.

Then, deciding if the test pixel includes image ringing artifacts in Step 608 includes deciding that P(i,j) includes ringing artifacts, if S(i,j)<threshold.

Additionally, Step 606 may, in response to comparing S(i,j) to the threshold, generate a map value M(i,j) for P(i,j), where:

$M(i,j) = 1$, if $S(i,j) >$ threshold; and, $M(i,j) = 0$, if $S(i,j) <$ threshold.

Then, generating FV in Step 612 includes using pixels from the second group to calculate FV, if they are equal to a first map value. In some aspects, FV is generated using a first map value of 0. In other aspects, the first map value is not equal to 1. Alternately, FV can be calculated by selecting pixels from the second group, if they are equal to the first map value.

For example, pixels may be randomly selected from the second group for the calculation of FV, if they are equal to the first map value. If Step 604 accepts a plurality of image pixel sets, in a plurality of frames, then generating FV in Step 612 may include substeps. Step 612a randomly selects a first collection of pixel positions with respect to the test pixel. Step 612b uses pixels in the first collection to calculate FV for each test pixel in every image pixel set, in every frame. In a different aspect, Step 612a randomly selects a first collection of pixel positions with respect to the test pixel in a first image pixel set in a current frame. Step 612b uses pixels in the first collection to calculate FV for each test pixel in every image pixel set in the current frame. Step 612c (not shown) randomly reselects a second collection of pixel positions in an image pixel set in a frame subsequent to the current frame. Step 612d (not shown) uses pixels in the second collection to calculate FV for each test pixel in every image pixel set in the subsequent frame.

In another aspect, Step 612 selects a predetermined collection of pixel positions with respect to the test pixel. If Step 604 accepts a plurality of image pixel sets in a plurality of frames, then Step 612 generates FV by selecting the pixels in the predetermined pixel positions to calculate FV for each test pixel in every image pixel set, in every frame. Alternately, Step 612e selects the pixels in a predetermined first collection of pixel positions to calculate FV for each test pixel in every image pixel set in a current frame. Step 612f selects the pixels in a predetermined second collection of pixel positions to calculate FV for each test pixel in every image pixel set in a frame subsequent to the current frame. As another alternative, Step 612e may select the pixels in the predetermined first collection of pixel positions to calculate FV for test pixels in a first image pixel set. Then, Step 612f selects the pixels in the predetermined second collection of pixel positions to calculate FV for test pixels in a second image pixel set.

In another aspect, using pixels from the second group to calculate FV, if they are equal to a first map value (Step 612), may include other substeps (not shown). Step 612g selectively weights second group pixel values. Step 612h sums the weighted values. Step 612i averages. With this aspect, the test pixel may be added to the second group of pixels. Further, Step 612g may weigh the pixels in response to the number of pixels in the second group.

In another aspect, the generation of FV (Step 612) may include:

calculating nV=sum of second group pixel values for pixels having a map value of 0;

calculating nE=total number of pixels in the second group with a map value of 0;

if nE=1, then $FV = (nV + P(i,j) + 1) >> 1$;

else, if nE<4, then $nV = nV + (4 - nE) * P(i,j)$; and, $FV = (nV + 2) >> 2$;

else, if nE<8, then $nV = nV + (8 - nE) * P(i,j)$; and, $FV=(nV+4)>>3;$ else, if nE=8, then $nV=nV-P(i+1,j+1)+P(i,j);$ and, $FV=(nV+4)>>3.$ Alternately, the generation of FV may include:

calculating nV=sum of second group pixel values for pixels having a map value of 0;

calculating nE=total number pixels in the second group with a map value of 0;

if nE=1, then $FV=(nV+P(i,j)+1)>>1;$ else, if nE<4, then $nV=nV+(4-nE)*P(i,j);$ and, $FV=(nV)>>2;$ else, if nE<8, then $nV=nV+(8-nE)*P(i,j);$ and, $FV=(nV)>>3;$ else, if nE=8, then $nV=nV-P(i+1,j+1)+P(i,j);$ and, $FV=(nV)>>3.$ In other aspects, generating FV in response to the second group data includes other substeps (not shown). Step 612*j* loads a lookup table (LUT) with the pre-calculated values. Typically, the LUT is loaded before the decision and filtering processes are performed. Step 612*k* accesses the LUT. For example, Step 612*k*1 calculates nE=the total number of pixels in the second group with the first map value. Then, Step 612*k*2 uses nE to access the LUT.

In one aspect, Step 612*j* loads a value for each nE indicating the number of times the test pixel P(i,j) is added. In another aspect, Step 612*j* loads a value for each nE indicating the number of times the result is right shifted. In a third aspect, Step 612*j* loads a value for each nE indicating if a pixel value from second group of pixels is subtracted or not.

FIG. 7 is a flowchart illustrating another aspect of the present invention image de-ringing filter method. The method starts at Step 700. Step 702 accepts a plurality of image pixels. Step 704 performs a mathematical operation on a first group of pixels neighboring a test pixel. Step 706, in response to the first group operation, decides if the test pixel includes image ringing artifacts. Step 708 performs a mathematical operation on a second group of pixels neighboring the test pixel. Step 710, in response to the second group operation, generates FV. Step 712 replaces the test pixel actual value with FV.

In one aspect, performing a mathematical operation on the first group of pixels (Step 704) includes: defining a matrix; and, multiplying the first group of pixels by the matrix. In another aspect, Step 704 compares values of pixels on opposite sides of a coordinate axis bisecting the test pixel.

In one aspect, generating a FV in response to the second group operation (Step 710) includes: generating a map value for each pixel in the second group; and, using pixels from the second group to calculate FV, if they are equal to a first map value.

A system and method have been provided for removing ringing artifacts that can be simply implemented after a compressed video decoding process. Some examples of specific algorithms have been described to clarify the invention. However, the invention is not limited to merely these examples.

Although abstract compressed video standards have been described, the present invention may be adapted for use with the following video standards: MPEG1, MPEG2, MPEG4, H.263, H.263+, H.263++, and H.264. Other variations and embodiments of the invention will occur to those skilled in the art.

I claim:

1. An image de-ringing filter method, the method comprising:

accepting a plurality of image pixels;

collecting data from a first group of pixels neighboring a test pixel;

in response to the first group data, deciding if the test pixel includes image ringing artifacts;

collecting data from a second group of pixels neighboring the test pixel;

in response to the second group data, generating a filtered value (FV);

replacing the test pixel actual value with FV;

wherein collecting data from a first group of pixels neighboring the test pixel includes performing a mathematical operation on the first group of pixels by comparing values of pixels on opposite sides of a coordinate axis bisecting the test pixel, wherein performing a mathematical operation on the first group of pixels includes defining a matrix; and, multiplying the first group of pixels by the matrix.

2. The method of claim 1 wherein collecting data from a second group of pixels neighboring a test pixel includes performing a mathematical operation on the second group of pixels.

3. The method of claim 1 wherein collecting data from a first group of pixels neighboring a test pixel further includes comparing the results of the mathematical operation to a threshold.

4. The method of claim 1 wherein the matrix is defined such that a zero value is assigned to the position of the test pixel in the matrix.

5. The method of claim 1 wherein comparing values of pixels on opposite sides of a coordinate axis bisecting the test pixel includes:

subtracting the values of pixels on a first side of the coordinate axis from pixels on a second side of the coordinate axis, opposite of the first side; and, comparing the difference to a threshold.

6. The method of claim 5 wherein comparing values of pixels on opposite sides of a coordinate axis bisecting the test pixel includes comparing the values of pixels on opposite sides of a plurality of coordinate axes, oriented in a plurality of directions.

7. The method of claim 6 wherein comparing values of pixels on opposite sides of a coordinate axis bisecting the test pixel includes:

with respect to a test pixel P(i,j), with i and j indicating row and column indices, respectively, and P(i,j) representing a pixel gray value, using operators H1 and H2 to derive gradient values gH1(i,j) and gH2(i,j), respectively, where $H1=[1\ 0\ -1];$ and, $$H2 = \begin{bmatrix} 1 \\ 0 \\ -1 \end{bmatrix}$$

calculating $S(i,j)=(|gH1(i,j)|+|gH2(i,j)|+1) >>1$;
where x represents a binary value right-shift of x;
  wherein deciding if the test pixel includes image ringing artifacts includes deciding that $P(i,j)$ includes ringing artifacts, if $S(i,j)<$threshold.

8. The method of claim 7 wherein comparing values of pixels on opposite sides of a coordinate axis bisecting the test pixel additional includes:
  in response to comparing $S(i,j)$ to the threshold, generating a map value $M(i,j)$ for $P(i,j)$, where:

$M(i,j)=1$, if $S(i,j)\geq$threshold; and, $M(i,j)=0$, if $S(i,j)<$threshold; and, wherein generating FV includes using pixels from the second group to calculate FV, if they are equal to a first map value.

9. The method of claim 8 wherein generating FV includes the first map value being equal to 0.

10. The method of claim 8 wherein generating FV includes the first map value not being equal to 1.

11. The method of claim 8 wherein generating FV includes selecting pixels from the second group to calculate FV, if they are equal to the first map value.

12. The method of claim 11 wherein generating FV includes randomly selecting pixels from the second group to calculate FV, if they are equal to the first map value.

13. The method of claim 12 wherein accepting a plurality of image pixels includes accepting a plurality of image pixel sets, in a plurality of frames;
  wherein generating FV includes:
    randomly selecting pixels in a first collection of pixel positions with respect to the test pixel;
    using pixels in the first collection to calculate FV for each test pixel in every image pixel set, in every frame.

14. The method of claim 12 wherein accepting a plurality of image pixels includes accepting a plurality of image pixel sets, in a plurality of frames;
  wherein generating FV includes:
    randomly selecting a first collection of pixel positions with respect to the test pixel in a first image pixel set in a current frame;
    using pixels in the first collection to calculate FV for each test pixel in every image pixel set in the current frame;
    randomly reselecting a second collection of pixel positions in an image pixel set in a frame subsequent to the current frame; and,
    using pixels in the second collection to calculate FV for each test pixel in every image pixel set in the subsequent frame.

15. The method of claim 11 wherein selecting pixels from the second group to calculate FV, if they are equal to the first map value, includes selecting a predetermined collection of pixel positions with respect to the test pixel.

16. The method of claim 15 wherein accepting a plurality of image pixels includes accepting a plurality of image pixel sets in a plurality of frames;
  wherein generating FV includes selecting the pixels in a predetermined first collection of pixel positions to calculate FV for each test pixel in every image pixel set, in every frame.

17. The method of claim 15 wherein accepting a plurality of image pixels includes accepting a plurality of image pixel sets in a plurality of frames:
  wherein generating FV includes:
    selecting the pixels in a predetermined first collection of pixel positions to calculate FV for each test pixel in every image pixel set in a current frame; and,
    selecting the pixels in a predetermined second collection of pixel positions to calculate FV for each test pixel in every image pixel set in a frame subsequent to the current frame.

18. The method of claim 15 wherein generating FV includes:
  selecting the pixels in a predetermined first collection of pixel positions to calculate FV for each test pixel in a first image pixel set; and,
  selecting the pixels in a predetermined second collection of pixel positions to calculate FV for each test pixel in a second image pixel set.

19. The method of claim 8 wherein using pixels from the second group to calculate FV, if they are equal to a first map value, includes:
  selectively weighting second group pixel values;
  summing the weighted values; and,
  averaging.

20. The method of claim 19 wherein collecting data from a second group of pixels neighboring the test pixel includes adding the test pixel to the second group of pixels.

21. The method of claim 19 wherein selectively weighting second group pixel values includes weighting in response to number of pixels in the second group.

22. The method of claim 8 wherein generating FV includes:
  calculating nV=sum of second group pixel values for pixels having a map value of 0;
  calculating nE=total number of pixels in the second group with a map value of 0;
  if nE=1, then $FV=(nV+P(i,j)+1)>>1$;

if nE<4, then $nV=nV+(4-nE)*P(i,j)$; and, $FV=(nV+2)>>2$;

if nE<8, then $nV=nV+(8-nE)*P(i,j)$; and, $FV=(nV+4)>>3$;

if nE=8, then $nV=nV-P(i+1,j+1)+P(i,j)$; and, $FV=(nV+4)>>3$.

23. The method of claim 8 wherein generating FV includes:
  calculating nV=sum of second group pixel values for pixels having a map value of 0;
  calculating nE=total number pixels in the second group with a map value of 0;
  if nE=1, then $FV=(nV+P(i,j)+1)>>1$;

if nE<4, then $nV=nV+(4-nE)*P(i,j)$; and, $FV=(nV)>>2$;

if nE<8, then $nV=nV+(8-nE)*P(i,j)$; and, $FV=(nV)>>3.$ if nE=8, then $nV=nV-P(i+1,j+1)P(i,j)$; and, $FV(nV)>>3.$ 24. The method of claim 8 wherein generating a FV in response to the second group data includes:
    loading a lookup table (LUT) with the pre-calculated values; and,
    accessing the LUT.

25. The method of claim 24 generating a FV includes:
    calculating nE=the total number of pixels in the second group with the first map value; and,
    using nE to access the LUT.

26. The method of claim 24 loading a LUT with the pre-calculated values includes loading a value for each nE indicating the number of times the result is right shifted.

27. The method of claim 24 loading a LUT with the pre-calculated values includes loading a value for each nE indicating if a pixel value from second group of pixels is subtracted.

28. The method of claim 24 loading a LUT with the pre-calculated values includes loading a value for each nE indicating the number of times the test pixel P(i,j) is added.

29. The method of claim 1 wherein collecting data from a first group of pixels neighboring a test pixel includes collecting data from a group of 4 pixels neighboring the test pixel.

30. The method of claim 1 further comprising:
    selecting a fixed threshold value.

31. The method of claim 1 further comprising:
    decoding compressed image information; and, wherein accepting a plurality of image pixels includes accepting the decoded image information.

32. The method of claim 1 wherein collecting data from a second group of pixels neighboring the test pixel includes adding the test pixel to the second group of pixels.

33. The method of claim 1 wherein collecting data from a second group of pixels neighboring the test pixel includes collecting data from 8 pixels neighboring the test pixel.

34. An image de-ringing filter method, the method comprising:
    accepting a plurality of image pixels;
    performing a mathematical operation on a first group of pixels neighboring a test pixel;
    in response to the first group operation, deciding if the test pixel includes image ringing artifacts;
    performing a mathematical operation on a second group of pixels neighboring the test pixel;
    in response to the second group operation, generating a filtered value (FV);
    replacing the test pixel actual value with FV;
    wherein performing a mathematical operation on the first group of pixels includes comparing values of pixels on opposite sides of a coordinate axis bisecting the test pixel, wherein performing a mathematical operation on the first group of pixels includes defining a matrix; and, multiplying the first group of pixels by the matrix.

35. The method of claim 34 generating a FV in response to the second group operation includes:
    generating a map value for each pixel in the second group; and,
    using pixels from the second group to calculate FV, if they are equal to a first map value.

36. An image de-ringing filter system, the system comprising:
    a decision unit having an input to accept a plurality of image pixels, the decision unit collecting data from a first group of pixels neighboring a test pixel, performing a mathematical operation on the first group of pixels by comparing values of pixels on opposite sides of a coordinate axis bisecting the test pixel, wherein the decision unit defining a matrix and multiplying the first group of pixels by the matrix and, in response to the first group data, supplying a decision at an output as to whether the test pixel includes image ringing artifacts; and,
    a filter having an input to accept the plurality of image pixels and an input to accept the decision, the filter collecting data from a second group of pixels neighboring the test pixel and, in response to the second group data, generating a filtered value (FV) and supplying the FV at an output as a replacement to the test pixel actual value.

37. The system of claim 36 wherein the filter performs a mathematical operation on the second group of pixels.

38. The system of claim 36 wherein the decision unit compares the results of the mathematical operation to a threshold.

39. The system of claim 36 wherein the decision unit defines a matrix such that a zero value is assigned to the position of the test pixel in the matrix.

40. The system of claim 36 wherein the decision unit subtracts the values of pixels on a first side of the coordinate axis from pixels on a second side of the coordinate axis, opposite of the first side, and compares the difference to a threshold.

41. The system of claim 40 wherein the decision unit compares the values of pixels on opposite sides of a plurality of coordinate axes, oriented in a plurality of directions.

42. The system of claim 41 wherein the decision unit:
    with respect to a test pixel P(i,j), with i and j indicating row and column indices, respectively, and P(i,j) represents a pixel gray value, uses operators H1 and H2 to derive gradient values gH1(i,j) and gH2(i,j), respectively, where $H1=[1\ 0\ -1]$; and, $$H2 = \begin{bmatrix} 1 \\ 0 \\ -1 \end{bmatrix}$$

calculates $S(i,j)=(|gH1(i,j)|+|gH2(i,j)|+1)>>1$;
    where x represents a binary value right-shift of x; and,
    decides that P(i,j) is a ringing artifact, if S(i,j)<threshold.

43. The system of claim 42 wherein the decision unit:
    in response to comparing S(i,j) to the threshold, generates a map value M(i,j) for P(i,j), where:

$M(i,j)=1$, if $S(i,j) \geq $threshold; and, $M(i,j)=0$, if $S(i,j)<$threshold;

wherein the filter generates a map value for each pixel in the second group and uses pixels from the second group to calculate FV, if they are equal to a first map value.

44. The system of claim 43 wherein the filter uses a first map value equal to 0.

45. The system of claim 43 wherein the filter uses a first map value not equal to 1.

46. The system of claim 43 wherein the filter selects pixels from the second group to calculate FV, if they are equal to the first map value.

47. The system of claim 46 wherein the filter randomly selects pixels from the second group to calculate FV, if they are equal to the first map value.

48. The system of claim 47 wherein the filter accepts a plurality of image pixel sets, in a plurality of frames and generates FV by:
   randomly selecting a first collection of pixel positions with respect to the test pixel;
   using pixels in the first collection to calculate FV for each test pixel in every image pixel set, in every frame.

49. The system of claim 47 wherein the filter accepts a plurality of image pixel sets, in a plurality of frames and generates FV by:
   randomly selecting a first collection of pixel positions with respect to the test pixel in a first image pixel set in a current frame;
   using pixels in the first collection to calculate FV for each test pixel in every image pixel set in the current frame;
   randomly reselecting a second collection of pixel positions in an image pixel set in a frame subsequent to the current frame; and,
   using pixels in the second collection to calculate FV for each test pixel in every image pixel set in the subsequent frame.

50. The system of claim 46 wherein the filter selects predetermined pixel positions, with respect to the test pixel, from the second group to calculate FV, if they are equal to the first map value.

51. The system of claim 50 wherein the filter accepts a plurality of image pixel sets in a plurality of frames and selects the pixels in the predetermined pixel positions to calculate FV for each test pixel in every image pixel set, in every frame.

52. The system of claim 50 wherein the filter accepts a plurality of image pixel sets in a plurality of frames and generates FV by:
   selecting the pixels in a predetermined first collection of pixel positions to calculate FV for each test pixel in every image pixel set in a current frame; and,
   selecting the pixels in a predetermined second collection of pixel positions to calculate FV for each test pixel in every image pixel set in a frame subsequent to the current frame.

53. The system of claim 50 wherein the filter generates FV by:
   selecting the pixels in a predetermined first collection of pixel positions to calculate FV for test pixels in a first image pixel set; and,
   selecting the pixels in a predetermined second collection of pixel positions to calculate FV for test pixels a second image pixel set.

54. The system of claim 43 wherein the filter uses pixels from the second group to calculate FV, if they are equal to a first map value, by:
   selectively weighting second group pixel values;
   summing the weighted values; and,
   averaging.

55. The system of claim 54 wherein the filter adds the test pixel to the second group of pixels.

56. The system of claim 54 wherein the filter selectively weights in response to number of pixels in the second group.

57. The system of claim 43 wherein the filter generates FV by:
   calculating nV=sum of second group pixel values for pixels having a map value of 0;
   calculating nE=total number of pixels in the second group with a map value of 0;
   if nE=1, then $FV=(nV+P(i,j)+1)>>1;$ if nE<4, then $nV=nV+(4-nE)*P(i,j);$ and, $FV=(nV+2)>>2;$ if nE<8, then $nV=nV+(8-nE)*P(i,j);$ and, $FV=(nV+4)>>3;$ if nE 8, then $nV=nV-P(i+1,j+1)P(i,j);$ and, $FV=(nV+4)>>3.$ 58. The system of claim 43 wherein the filter generates FV by:
   calculating nV=sum of second group pixel values for pixels having a map value of 0;
   calculating nE=total number pixels in the second group with a map value of 0;
   if nE 1, then $FV=(nV+P(i,j)+1)>>1;$ if nE<4, then $nV=nV+(4-nE)*P(i,j);$ and, $FV=(nV)>>2;$ if nE<8, then $nV=nV+(8-nE)*P(i,j);$ and, $FV=(nV)>>2;$ if nE=8, then $nV=nV-P(i+1,j+1)+P(i,j);$ and, $FV=(nV)>>3.$ 59. The system of claim 43 further comprising:
   an accessible memory including a lookup table (LUT) with pre-calculated values;
   wherein the filter generates a FV in response accessing the LUT.

60. The system of claim 59 wherein the LUT is indexed by nE values: and,
   wherein the filter calculating nE=the total number of pixels in the second group with the first map value, and uses nE to access the LUT.

61. The system of claim 60 wherein the LUT includes a value for each nE indicating the number of times the test pixel P(i,j) is added.

62. The system of claim 60 loading the LUT includes a value for each nE indicating the number of times the result is right shifted.

63. The system of claim 60 wherein the LUT includes a value for each nE indicating if a pixel value from second group of pixels is subtracted.

64. The system of claim 36 wherein the decision unit collects data from a group of 4 pixels neighboring the test pixel.

65. The system of claim 36 further comprising:
a decoder having a connection to accepted encoded video information and an output to supply the plurality of image pixels to the decision unit, and to the filter, as decoded image information.

66. The system of claim 36 wherein the filter adds the test pixel to the second group of pixels.

67. The system of claim 36 wherein the filter collects data from 8 pixels neighboring the test pixel.

* * * * *

UNITED STATES PATENT AND TRADEMARK OFFICE
CERTIFICATE OF CORRECTION

| | | |
|---|---|---|
| PATENT NO. | : 7,471,845 B2 | Page 1 of 1 |
| APPLICATION NO. | : 10/815029 | |
| DATED | : December 30, 2008 | |
| INVENTOR(S) | : Sachin Deshpande | |

It is certified that error appears in the above-identified patent and that said Letters Patent is hereby corrected as shown below:

In col. 16, line 41, there is an error in claim 58. As printed, col. 16, line 41 ends with the number "2". The line should end with the number "3".

Claim 58 should appear as follows:

58. The system of claim 43 wherein the filter generates FV by:
calculating nV = sum of second group pixel values for pixels having a map value of 0;
calculating nE = total number pixels in the second group with a map value of 0;
if nE = 1, then FV = (nV + P(i,j) + 1) 1:
if nE 4, then
nV = nV + (4 - nE)*P(i,j); and,
FV = (nV) 2;
if nE 8, then
nV = nV + (8 - nE)*P(i,j); and,
FV = (nV) 3;
if nE = 8, then
nV = nV - P(i + 1, j + 1) + P(i,j); and,
FV = (nV) 3.

Signed and Sealed this

Fourteenth Day of April, 2009

JOHN DOLL
*Acting Director of the United States Patent and Trademark Office*